INVENTORS
KARL JIRKA
JOHANN GUTLHUBER

INVENTORS
KARL JIRKA
JOHANN GÜTLHUBER

United States Patent Office 3,705,950
Patented Dec. 12, 1972

3,705,950
SEALED CONNECTOR BOX FOR
ELECTRICAL CABLES
Karl Jirka, Munich, and Johann Gutlhuber, Irlbach, near Straubing, Germany, assignors to Kunststoffwerk Gebruder Anger G.m.b.H., Munich, Germany
Filed Nov. 19, 1970, Ser. No. 91,007
Claims priority, application Germany, Nov. 19, 1969, P 19 58 155.6
Int. Cl. H02g 15/08
U.S. Cl. 174—138 F
6 Claims

ABSTRACT OF THE DISCLOSURE

A sealed connector box for electrical cables is made of a transparent synthetic material and comprises two sleeve elements having conical end portions interconnected by an intermediate tubular member by a screw connection. There are end openings in both ends of the conical end portions through which electrical cables may be inserted and spliced within the tubular element so that the splice is visible. A sealing element fills the interior of the conical end portion and is provided with a plurality of flexible internal ribs which sealingly engage the outer surface of an electrical cable passing therethrough. Other seals are provided on the end opening of each conical end portion and on the joint between a sleeve element and the intermediate tubular element.

---

The present invention relates to a connector box for electrical cables, more particularly, to a reusable sealed connector box of a transparent synthetic plastic material within which a splice between electrical cables is visible.

Various forms of sealed boxes have been used to enclose a connection between various types of electrical cables such as telephone and other communication cables. One form of a sealed enclosure comprised casting or molding an enclosure from lead or other suitable material around the cable connection. Such sealed connectors had the disadvantage that they were rather expensive to construct since expert knowledge and considerable skill was required on the part of the personnel to fabricate these lead seals in situ. The fabrication of each lead seal required considerable time on the part of such trained personnel and the resulting sealed connector was not completely sealed against gases and water. As a result, the leakage of any gas or water into the connector was a potential source of disturbance in a telephone or communication network.

Sealed connector boxes have also been formed of a synthetic resin which is cast around the splice or connection between two electrical cables in a mold of transparent synthetic resin preferably in sheet form so that the casting procedure could be readily observed. The mold then remained on the casting. Another form of sealing connector comprised a porous base wound on the splice or connection with a non-porous band then being wound around the porous base. A resin in molten form was then injected under pressure through an opening made in the cover so that the resin would become solidified and seal the connection. The resulting connector was a resinous body which tightly adhered to the cable connection.

The sealed connector box which was filled with cast resin had the advantage of preventing any formation of water of condensation therein but required a considerable amount of time and care on the part of skilled personnel for its manufacture in situ so that such connectors were quite expensive. However, the connector boxes formed in this manner and filled with cast resin had the significant disadvantage that the connection between the electrical cable sealed by the box was no longer accessible after the resin was cast in position. In the event it was necessary to repair the connection the sealed connector would have to be destroyed and a new connector would have to be cast into position. Accordingly, it was not possible to reuse the sealed connector and this also added to its cost. As a further disadvantage in most cases it was necessary that a small end portion of the connected cables to which the cast resin adhered would also have to be destroyed and an intermediate cable section would then be inserted to replace the destroyed cable ends. In view of these disadvantages the use of such sealed connector boxes was not particularly satisfactory.

It is therefore the principal object of the present invention to provide a novel and improved sealed connector box of synthetic plastic material for electrical cables and the like.

It is another object of the present invention to provide a sealed connector box for electrical cables which is gastight, water-tight and stable over long periods of time and which permits ready access to the cable connection at any time.

It is a further object of the present invention to provide a sealed connector box of synthetic plastic for electrical cables which can be quickly and inexpensively installed over the cable connection and can be reused after access has been made to the sealed connection.

The objects of the present invention are achieved and the disadvantages of the prior art as described above are eliminated by the sealed connector box disclosed herein. According to the present invention a sealed connector box for electrical cables and the like may comprise a pair of sleeve elements each having a tubular portion and a substantially conical end portion extending therefrom with there being an opening in each end of the conical end portion through which an electrical cable may be inserted. The conical end portions have a stepped configuration with the diameter of the steps progressively decreasing toward the end opening. Annular means which may comprise an intermediate tubular member is detachably and sealingly connected to the tubular portions of the sleeve elements in face-to-face relationship to define a closed chamber within which the electrical cable inserted through the end openings of the sleeve elements is spliced. Within each of the conical end portions there is provided a sealing element which conforms to the internal configuration of the end portion and which sealingly engages the outer surface of an electrical cable inserted therethrough. This sealing means may comprise a plurality of flexible internal ribs which are sealingly engageable with electrical cables of several different outer diameters. Means are also provided on the end openings of each sleeve element for sealingly engaging a large range of diameters of electrical cables inserted therethrough. This sealing means may be positioned on the smallest diameter stepped portion of each sleeve element.

The connection between the intermediate tubular element and the two sleeve elements may be a screw connection with suitable forms of sealing rings interposed between the mating surfaces of these elements. At least portions of the sleeve and intermediate tubular elements are made of a transparent synthetic plastic material so that the electrical connection within the connector box is visible for inspection and other purposes.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
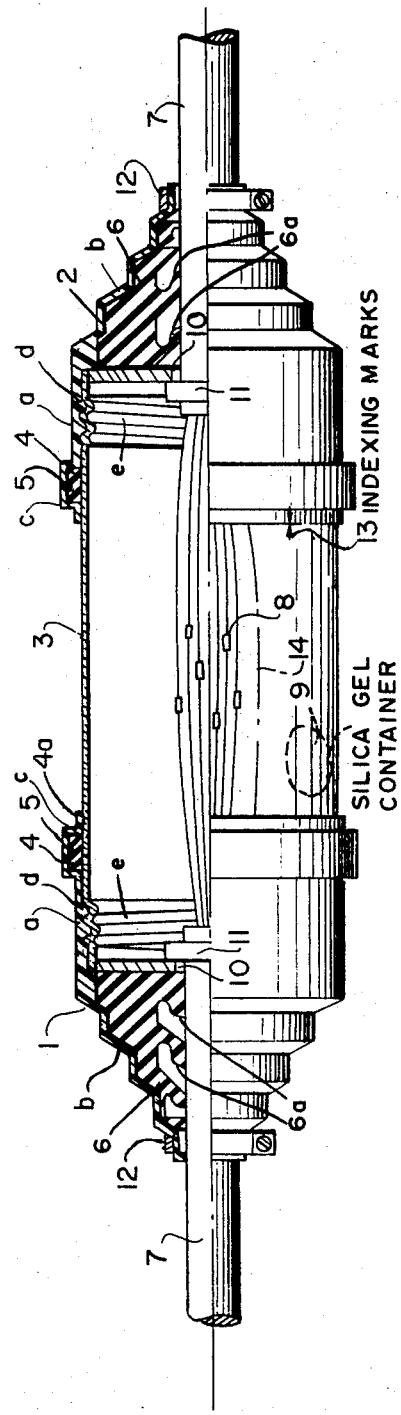
FIG. 1 is an elevational view of a sealed connector box according to the present invention with the upper half of the connector box being a longitudinal section.

As may be seen in FIG. 1 a sealed connector box comprises two sleeve elements 1 and 2 with each sleeve element having a tabular portion $a$ and a substantially conical end portion $b$ with each end portion having a stepped configuration comprising a plurality of annular shoulders of decreasing diameter toward the end thereof. The tubular portions $a$ are connected in face-to-face relationship by an intermediate tubular member 3. Each tubular portion $a$ is provided with a corrugation or annular groove $c$ within which is inserted a sealing ring 4 which may be of the so-called air-cushion type or an O-ring. The air-cushion ring may be curved to form a space therein so as to define a resilient air cushion 5 between the inner wall of the corrugation $c$ and the central portion of sealing ring 4. The outer end of each tubular portion $a$ is provided with a lip 4a which extends outwardly from the annular corrugation $c$ to abut against the outer surface of the intermediate tubular element 3 to provide a sealed connection between the tubular element 3 and sleeve elements 1 and 2.

The sleeve elements 1 and 2 are each provided with internal threads $d$ which threadedly receive similar threads $e$ on the ends of the intermediate tubular element 3. The threads may have any suitable configuration such as round or square.

Within each stepped or conical portion of sleeve elements 1 and 2 there is sealing element 6 which conforms to the internal configuration of the stepped portion as may be seen in FIG. 1. The sealing element 6 extends throughout the length of the stepped portion and is provided with a plurality of internal flexible ribs 6a which sealingly engage the outer surface of an electrical cable 7 inserted through the end opening of the sleeve element and which is to be connected within the connector box. The flexible ribs or lips 6a form a labyrinth seal with respect to the electrical cable 7.

The cables 7 which are inserted through the end openings of the sleeve elements are connected by means of a splice 8 which may comprise a plurality of spliced connections between the individual electrical leads comprising the cable. The intermediate tubular element 3 may be made of a transparent synthetic resin or at least a portion of this tubular element is transparent so that the spliced connection 8 may be inspected visually at any time. A container 9 for silica gel or the like may be provided within the chamber defined by the tubular element 3 to absorb any water or condensation.

In order to retain the sealing element 6 in position during assembly operations and to prevent any slipping of this element a disk 10 having a central opening therethrough is positioned over the end of the electrical cable 7 and abuts the sealing element 6. A cable clamp 11 also prevents any tearing of the cable sheathing at the spliced connection 8 and also longitudinally positions the connector box with respect to the electrical cable and locks the connector box in position. The threaded ends of the intermediate tubular element 3 also provide a longitudinal locking force with respect to the sleeve elements 1 and 2. An index mark 13 may be provided on the separate elements 1, 2 and 3 to indicate the correct position of these elements during the operation of assembling this connector box over the cable connection.

A clamp 12 which may be similar to a pipe clamp is positioned around the last or smallest stepped portion of the conical ends of the sleeve elements 1 and 2 so as to clamp these ends of these sleeve elements around the respective electrical cables 7. The clamp 12 is such as to accommodate electrical cables having different outer diameters.

The several stepped portions of each sleeve element may be cut off and a clamp positioned around the last remaining stepped portion so as to accommodate electrical cables of considerably greater outside diameter than illustrated in the drawing.

For the connection of certain electrical cables one of the clamps 11 or 12 may be omitted. The clamp 11 is generally always required if the two ends of the cable sheathing of the spliced cable 7 are to be connected electrically to each other such as by means of a flexible conductor 14 which may comprise stranded wire or the like.

Figure 2:
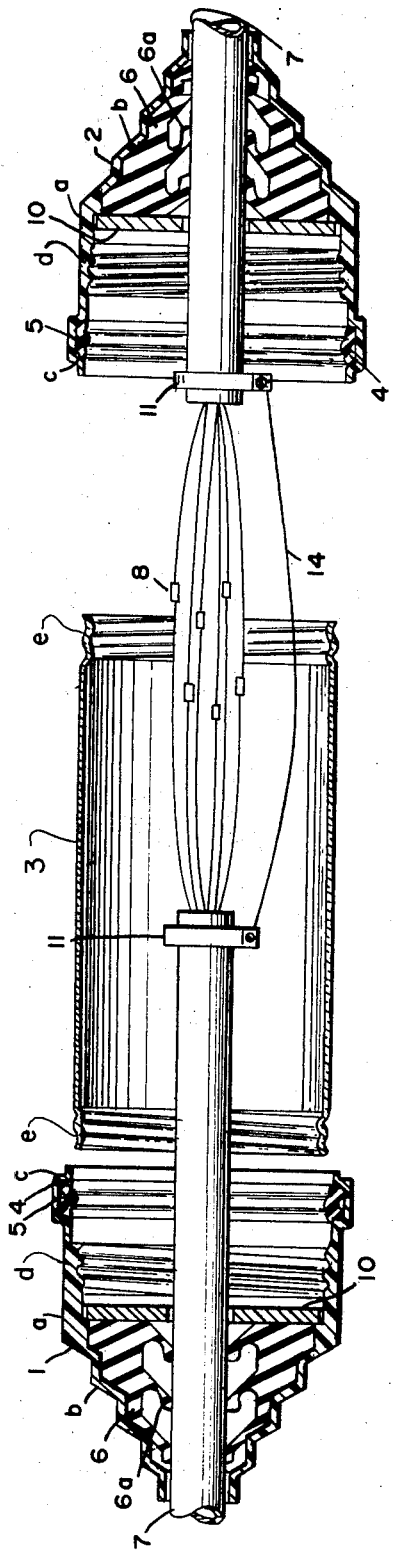
FIG. 2 is a longitudinal sectional view of the connector box of FIG. 1 but showing the several elements thereof in spaced relationship prior to assembly.

In FIG. 2 there is illustrated the several components of the connector box prior to the final assembly thereof into the position as shown in FIG. 1. In the assembly, the two sleeve elements 1 and 2 are slid over the ends of the electrical cable 7 after the sealing element 6 or the cable sheathing has been provided with a suitable lubricant. In the same manner, the intermediate tubular element 3 and the two abutment disks 10 are slid over the ends of the cable 7. After the work on the ends of cable 7 and/or the splice 8 has been completed, the separate components of the connector box are moved toward each other and the sleeve elements are screwed onto each end of the tubular element 3. The result is the connector box as shown in FIG. 1.

Figure 3:
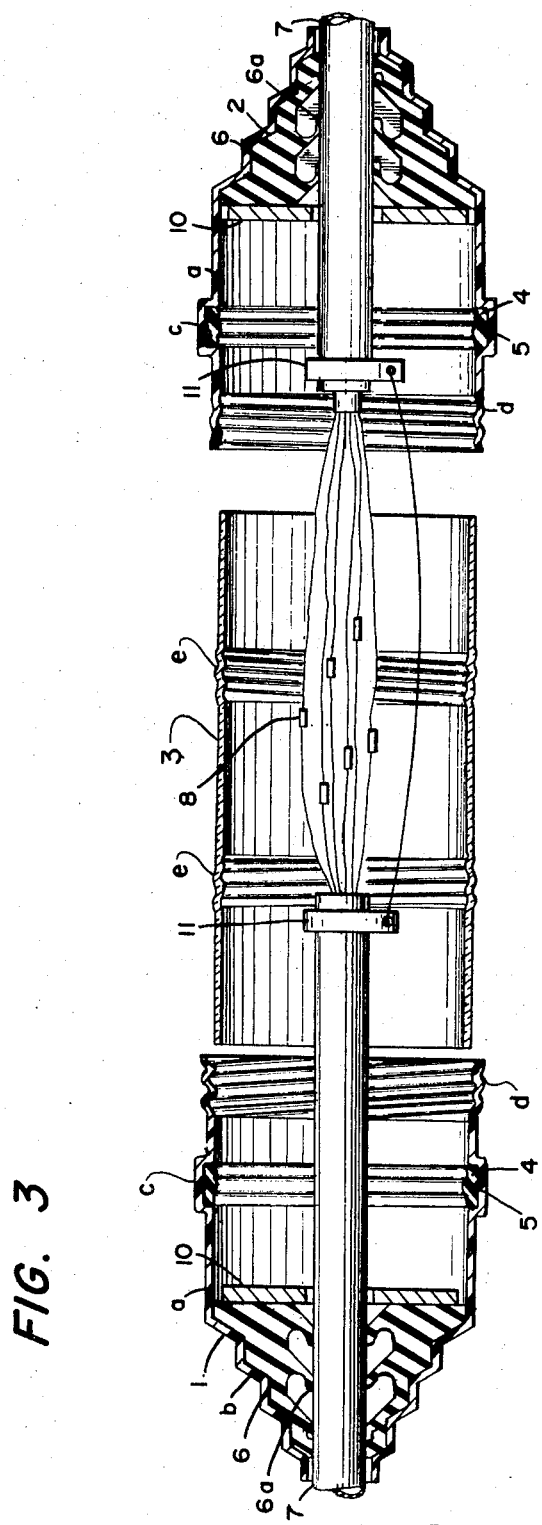
FIG. 3 is a view similar to that of FIG. 2 but showing a modification of the present connector box.

In the modification of FIG. 3, the threads $e$ of tubular element 3 are moved inwardly toward the center thereof and the threads $d$ on the sleeve elements 1 and 2 are moved to the ends thereof. The sealing ring 4 is thus positioned in the corrugation $c$ behind threads $d$ of the sleeve elements 1 and 2.

Figure 4:
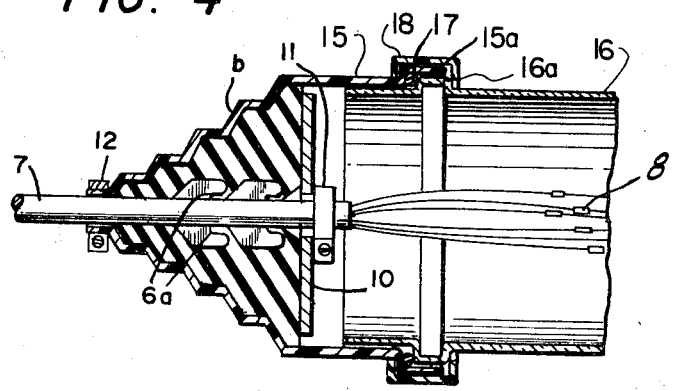
FIG. 4 is a longitudinal sectional view of a half of the sealed connector box according to the present invention and showing a further modification.

In the modification of FIG. 4 there is illustrated a different type of connection between the end elements 1 and 2 and the intermediate tubular element 3. The sleeve element 15 is provided with an external flange 15a which mates with an external flange 16a on the other sleeve element 16 or on the intermediate tubular element. A sealing ring 17 which may be an O ring is positioned between the flanges 16a and 15a with a portion of this sealing ring positioned behind the flange 16a. The connection is completed by positioning a U-shaped clamping ring 18 around the mating flanges and sealing ring. The interconnected parts can then be released merely by removing the clamping ring 18. The flange 15a may also be provided with a longitudinal extension to form, in effect, an open corrugation or groove with a sealing ring being positioned therebetween. An open corrugation may also be formed on the element 16 with the sealing ring being positioned between the two corrugations.

Figure 5:
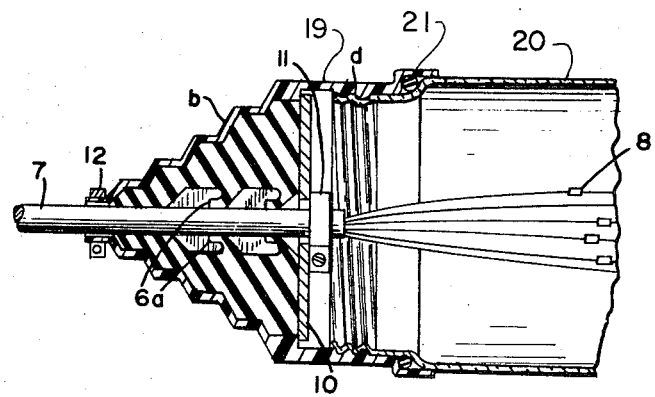
FIG. 5 is a view similar to that of FIG. 4 and showing a modification of the connector box shown in FIG. 4.

In the modification of FIG. 5, elements 19 and 20 are screwed together by threads in the manner similar to that described above and sealed by means of a sealing ring 21 of the type employed in the modification of FIG. 4. While a threaded connection has been disclosed in the present application it is understood that other forms of connections such as bayonet catches and other suitable arrangements as known in the art may be employed.

The sealed connector box of the present invention can be adjusted to accommodate various diameters of cable sheathing by the use of sealing elements 6 which have different diameter openings therethrough to accommodate corresponding diameter electrical cables. However, it is pointed out that the sealing element 6 as disclosed herein with its internal flexible ribs can readily accommodate a wide range of diameters of electrical cables. Further, as described above, a suitable stepped section of a sleeve element can be removed to correspond to the diameter of the electrical cable to be accommodated.

The sealed connector box according to the present invention is readily adaptable for use with all types of sheaths for electrical cables, may be assembled and reassembled a number of times so that the same connector box may be used over and over again, and is sealed tightly against water and gas. Any mechanical stresses to which the connector may be subjected such as tension, compression, torsion or bending are readily absorbed by the structure of the connector box as disclosed herein. A further advantage of the connector box resides in enabling splicing operations to be performed on the cable at any time even after assembly of the connector box without the necessity of damaging any portion of the connector box or the cables connected therein. Since at least one portion of the sealed connector box is transparent the connector box may be inspected at any time to insure that moisture has not leaked therein or to examine the connection.

While the connector box is particularly adapted to be constructed of synthetic plastic materials such as resins and the like known in the art other materials such as metal, porcelain and the like may also be used.

It is understood that this invention is susceptible to modification in order to adapt it to different usages and conditions and, accordingly, it is desired to comprehend such modifications within the invention as may fall within the scope of the appended claims.

What is claimed is:

1. A reusable sealed connector box for electrical cables comprising a pair of sleeve elements each having a tubular portion and a substantially conical end portion extending therefrom, there being an opening in the end of each conical end portion into which an electrical cable may be inserted, each said conical end portion having a stepped configuration decreasing in diameter toward its end opening, an intermediate tubular element detachably and sealingly connecting said tubular portions in face-to-face relationship to define a closed chamber within which the electrical cable ends to be inserted through the sleeve elements may be spliced, there being an internal annular shoulder within the end of the tubular portion of each sleeve element, a sealing ring at each said annular shoulder, means within each of said conical portions conforming to the internal configuration thereof for sealingly engaging the outer surface of an electrical cable to be inserted therethrough, said sealing means comprises a plurality of flexible internal ribs which are sealingly engageable with electrical cables of several different outer diameters, and means on the end opening of each sleeve element for sealingly engaging a large range of diameters of electrical cables.

2. A reusable sealed connector box as claimed in claim 1 and comprising a clamping ring having a U-shaped cross-section connecting the end of a sleeve element and the end of said intermediate tubular element.

3. A reusable sealed connector box as claimed in claim 1 and comprising an external flange on the mating ends of each sleeve element and said intermediate tubular element, said sealing ring having a portion thereof behind the external flange on each sleeve and intermediate tubular element.

4. A reusable sealed connector box as claimed in claim 1 and comprising a disk within each sleeve element abutting against the sealing means therein, said disk having an opening therethrough to receive an electrical cable and displaceable on said cable.

5. A reusable sealed connector box as claimed in claim 1 wherein individual ones of the stepped portions of each conical end portion are removeable.

6. A reusable sealed connector box as claimed in claim 1 wherein each sealing ring comprises an annular member having an air space to define an air cushion.

References Cited

UNITED STATES PATENTS

| 2,517,717 | 8/1950 | Rose | 174—152 G UX |
| 2,688,651 | 9/1954 | Blake | 174—93 |
| 2,897,533 | 8/1959 | Bull et al. | 174—153 G X |
| 2,923,762 | 2/1960 | Falkenstein | 174—92 |
| 3,054,847 | 9/1962 | Colbert | 174—93 X |
| 3,504,099 | 3/1970 | Beinhaur | 174—138 F X |

FOREIGN PATENTS

| 208,316 | 5/1957 | Australia. |
| 702,138 | 1/1941 | Germany. |
| 726,662 | 10/1942 | Germany. |
| 1,490,467 | 9/1969 | Germany. |
| 262,532 | 12/1926 | Great Britain. |
| 989,480 | 4/1965 | Great Britain. |

LARAMIE E. ASKIN, Primary Examiner

U.S. Cl. X.R.

174—77 R, 93